United States Patent
Kami et al.

(10) Patent No.: US 10,619,033 B2
(45) Date of Patent: Apr. 14, 2020

(54) PNEUMATIC TIRE

(71) Applicant: SUMITOMO RUBBER INDUSTRIES, LTD., Hyogo (JP)

(72) Inventors: Nanaho Kami, Kobe (JP); Takayuki Nagase, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 72 days.

(21) Appl. No.: 16/056,975

(22) Filed: Aug. 7, 2018

(65) Prior Publication Data

US 2019/0048172 A1    Feb. 14, 2019

(30) Foreign Application Priority Data

Aug. 10, 2017 (JP) .................. 2017-155462

(51) Int. Cl.
| | |
|---|---|
| C08L 9/06 | (2006.01) |
| B60C 1/00 | (2006.01) |
| C08L 9/00 | (2006.01) |
| C08K 3/36 | (2006.01) |
| C08K 5/548 | (2006.01) |
| C08C 19/25 | (2006.01) |
| C08F 236/10 | (2006.01) |

(52) U.S. Cl.
CPC .............. C08L 9/06 (2013.01); B60C 1/0016 (2013.01); C08C 19/25 (2013.01); C08F 236/10 (2013.01); C08K 3/36 (2013.01); C08K 5/548 (2013.01); C08L 9/00 (2013.01); C08L 2205/025 (2013.01); C08L 2205/035 (2013.01); C08L 2312/08 (2013.01)

(58) Field of Classification Search
USPC ................... 525/102, 105; 152/905; 524/571
See application file for complete search history.

(56) References Cited

U.S. PATENT DOCUMENTS

| | | | | |
|---|---|---|---|---|
| 5,496,883 A | * | 3/1996 | Hamada ................ | B60C 1/0016 524/104 |
| 5,844,044 A | * | 12/1998 | Sandstrom ............ | C08F 236/04 525/237 |
| 2004/0177907 A1 | * | 9/2004 | Steiner ...................... | B60C 1/00 152/209.5 |

FOREIGN PATENT DOCUMENTS

JP    2004-002622 A    1/2004

* cited by examiner

*Primary Examiner* — Fred M Teskin
(74) *Attorney, Agent, or Firm* — Studebaker & Brackett PC

(57) ABSTRACT

The present invention provides a pneumatic tire which provides a balanced improvement of fuel economy, abrasion resistance, and performance on ice and snow. Provided is a pneumatic tire including a tread formed from a rubber composition, the rubber composition containing: a rubber component including a butadiene polymer having a trans content of 45% by mass or higher and a vinyl content of 20% by mass or lower; silica; a silane coupling agent having two or more sulfur-containing functional groups capable of binding to diene rubbers; and a crosslinking agent having a C3 or higher alkylene group, a polysulfide group bonded to the alkylene group, and a functional group containing a benzene ring.

5 Claims, No Drawings

PNEUMATIC TIRE

TECHNICAL FIELD

The present invention relates to a pneumatic tire.

BACKGROUND ART

In recent years, there has been an increased demand for pneumatic tires for vehicles having fuel economy, abrasion resistance, and other properties, and various efforts have been made to improve these properties. In winter, other properties including performance on ice and snow are further needed in addition to the above-mentioned properties.

Known techniques for improving fuel economy and abrasion resistance of rubber compositions involve incorporation of a triblock copolymer containing a block segment of styrene monomer units and a block segment of rubber monomer units into rubber compositions (see, for example, Patent Literature 1). However, there is still room for further improvement in properties of tires.

CITATION LIST

Patent Literature

Patent Literature 1: JP 2004-2622 A

SUMMARY OF INVENTION

Technical Problem

The present invention aims to solve the problem and provide a pneumatic tire which provides a balanced improvement of fuel economy, abrasion resistance, and performance on ice and snow.

Solution to Problem

The present invention relates to a pneumatic tire, including a tread formed from a rubber composition, the rubber composition containing: a rubber component including a butadiene polymer having a trans content of 45% by mass or higher and a vinyl content of 20% by mass or lower; silica; a silane coupling agent having two or more sulfur-containing functional groups capable of binding to diene rubbers; and a crosslinking agent having a C3 or higher alkylene group, a polysulfide group bonded to the alkylene group, and a functional group containing a benzene ring.

Preferably, the rubber composition contains the crosslinking agent and the silane coupling agent at a mass ratio of 1:3 to 1:15.

Preferably, a difference between a cis content and the trans content of the butadiene polymer is 30% by mass or less.

Preferably, the crosslinking agent is a compound represented by the following formula (1):

$$R^{11}-S-S-A-S-S-R^{12} \quad (1)$$

wherein A represents a C3-C10 alkylene group; and $R^{11}$ and $R^{12}$ are the same or different and each represent a monovalent organic group containing a nitrogen atom and a benzene ring.

Preferably, the silane coupling agent contains a linking unit A represented by the following formula (2-2) and a linking unit B represented by the following formula (2-3):

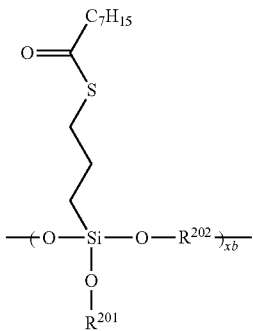

(2-2)

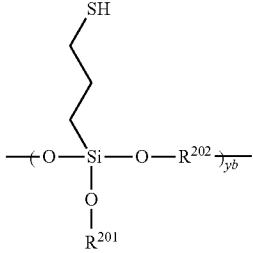

(2-3)

wherein xb represents an integer of 1 or more; yb represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{202}$ represents a branched or unbranched C1-C30 alkylene group, a branched or unbranched C2-C30 alkenylene group, or a branched or unbranched C2-C30 alkynylene group, provided that $R^{201}$ and $R^{202}$ may together form a cyclic structure.

Advantageous Effects of Invention

The pneumatic tire of the present invention includes a tread formed from a rubber composition that contains: a rubber component including a butadiene polymer having a trans content of 45% by mass or higher and a vinyl content of 20% by mass or lower; silica; a silane coupling agent having two or more sulfur-containing functional groups capable of binding to diene rubbers; and a crosslinking agent having a C3 or higher alkylene group, a polysulfide group bonded to the alkylene group, and a functional group containing a benzene ring. Such a pneumatic tire provides a balanced improvement of fuel economy, abrasion resistance, and performance on ice and snow.

DESCRIPTION OF EMBODIMENTS

The pneumatic tire includes a tread formed from a rubber composition. The rubber composition contains a rubber component including a butadiene polymer having a trans content of 45% by mass or higher and a vinyl content of 20% by mass or lower; silica; a silane coupling agent having two or more sulfur-containing functional groups capable of binding to diene rubbers; and a crosslinking agent having a C3 or higher alkylene group, a polysulfide group bonded to the alkylene group, and a functional group containing a benzene ring. Owing to these features, the pneumatic tire provides a balanced improvement of fuel economy, abrasion resistance, and performance on ice and snow.

In particular, the combined use of the specific butadiene polymer, the specific silane coupling agent, and the specific crosslinking agent synergistically improves the balance of the properties.

Although not clear, the reason for the above effect seems to be as follows.

The silane coupling agent having two or more sulfur-containing functional groups capable of binding to diene rubbers allows the reaction between the rubber component and silica to occur in a plane, rather than at a point, so that they are strongly bonded together, thereby improving abrasion resistance. Further, the silane coupling agent allows for high temperature kneading, highly efficient reaction with silica, and improved dispersion of silica, and thus limits the movement of the polymer bonded to silica, thereby improving fuel economy.

Moreover, the crosslinking agent having a C3 or higher alkylene group, a polysulfide group bonded to the alkylene group, and a functional group containing a benzene ring allows the rubber component molecules to bond with each other through carbon chains, and thus can be expected to further improve abrasion resistance. However, the presence of the functional group containing a benzene ring hinders the crosslinking agent from reaching and reacting with the polymer. In addition, when the crosslinking agent is used with the silane coupling agent, which binds to the rubber component at multiple sites, it is further difficult to react the crosslinking agent with the rubber component.

To overcome this problem, a butadiene polymer having a trans content of 45% by mass or higher and a vinyl content of 20% by mass or lower is used as a rubber component to sufficiently react and bond with both the silane coupling agent and the crosslinking agent. Thus, the silica-rubber component bonds and rubber component-rubber component bonds are reinforced so that abrasion resistance and fuel economy can be synergistically improved. In addition, since the rubber composition is less likely to become hard at low temperatures, performance on ice and snow is improved as well.

(Rubber Composition for Tread)

The rubber composition used for producing the tread is described below.

The rubber component in the rubber composition includes a butadiene polymer having a trans content of 45% by mass or higher and a vinyl content of 20% by mass or lower.

The butadiene polymer herein refers to a polymer containing 90% by mass or more of a structural unit derived from butadiene. It may be a homopolymer of butadiene or a copolymer of butadiene and another monomer such as styrene. In other words, the butadiene polymer may be, for example, a styrene butadiene rubber having a trans content of 45% by mass or higher, a vinyl content of 20% by mass or lower, and a styrene content of 10% by mass or lower.

The butadiene polymer has a trans content of 45% by mass or higher, preferably 50% by mass or higher, but preferably 70% by mass or lower, more preferably 60% by mass or lower, still more preferably 55% by mass or lower. A trans content of 70% by mass or lower tends to lead to further improved abrasion resistance.

The butadiene polymer has a vinyl content of 20% by mass or lower, preferably 15% by mass or lower. The butadiene polymer having a vinyl content of 20% by mass or lower tends to have better reactivity with the silane coupling agent and the crosslinking agent, thereby resulting in further improved fuel economy and abrasion resistance. The vinyl content is also preferably 5% by mass or higher, more preferably 10% by mass or higher. The butadiene polymer having a vinyl content of 5% by mass or higher tends to have better reactivity with the silane coupling agent, thereby resulting in further improved fuel economy and abrasion resistance.

The butadiene polymer preferably has a cis content of 20% by mass or higher, more preferably 30% by mass or higher. A cis content of 20% by mass or higher tends to lead to further improved abrasion resistance. The cis content is also preferably 50% by mass or lower, more preferably 40% by mass or lower.

The cis content, trans content, and vinyl content herein may be measured by infrared absorption spectrometry.

The difference between the cis content and the trans content of the butadiene polymer is preferably 30% by mass or less, more preferably 20% by mass or less. The butadiene polymer with a difference of 30% by mass or less tends to have better reactivity with the silane coupling agent and the crosslinking agent, thereby resulting in further improved fuel economy and abrasion resistance. The difference is also preferably 5% by mass or more, more preferably 10% by mass or more. When the difference is 5% by mass or more, the surface of the silica tends to be hydrophobized with the coupling agent.

The butadiene polymer preferably has a weight average molecular weight (Mw) of 200,000 or more, more preferably 400,000 or more, still more preferably 500,000 or more. A Mw of 200,000 or more tends to lead to further improved abrasion resistance. The Mw is also preferably 900,000 or less, more preferably 700,000 or less, still more preferably 600,000 or less. A Mw of 900,000 or less tends to lead to better kneading processability.

Herein, the Mw may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The butadiene polymer may be a chain end-unmodified butadiene polymer or a chain end-modified butadiene polymer. Preferably, it is a chain end-modified butadiene polymer because in this case the effects of the present invention tend to be better achieved.

The chain end-modified butadiene polymer may be any butadiene polymer terminated with a functional group interactive with a filler such as silica or carbon black. For example, it may be a chain end-modified butadiene polymer obtained by modifying at least one chain end of a butadiene polymer with a compound (modifier) having the functional group (chain end-modified butadiene polymer terminated with the functional group) or a chain end-modified butadiene polymer that has been modified (coupled) with a polyfunctional compound having two or more epoxy groups in the molecule so that a hydroxyl or epoxy group is introduced.

Examples of the functional group in the chain end-modified butadiene polymer include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. To more suitably achieve the effects of the present invention, amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

The amount of the butadiene polymer based on 100% by mass of the rubber component is preferably 5% by mass or more, more preferably 10% by mass or more, but is preferably 40% by mass or less, more preferably 30% by mass or less, still more preferably 20% by mass or less. When the amount is within the above-mentioned range, the effects of the present invention tend to be better achieved.

Examples of other rubber materials that may be used in the rubber component include diene rubbers, such as polybutadiene rubber (additional BR) and styrene butadiene rubber (additional SBR) other than the butadiene polymer, isoprene-based rubbers, acrylonitrile butadiene rubber (NBR), chloroprene rubber (CR), butyl rubber (IIR), and styrene-isoprene-butadiene copolymer rubber (SIBR). These diene rubbers may be used alone, or two or more of these may be used in combination. Among these, isoprene-based rubbers, additional SBR, and additional BR are preferred because they tend to provide better fuel economy and abrasion resistance.

Examples of the isoprene-based rubbers include natural rubber (NR), polyisoprene rubber (IR), refined NR, modified NR, and modified IR. The NR may be one commonly used in the tire industry such as SIR20, RSS#3, or TSR20. Non-limiting examples of the IR include those commonly used in the tire industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These rubbers maybe used alone, or two or more of these may be used in combination.

The amount of the isoprene-based rubber based on 100% by mass of the rubber component is preferably 5% by mass or more, but is preferably 30% by mass or less, more preferably 20% by mass or less. When the amount is within the above-mentioned range, the effects of the present invention tend to be better achieved.

Examples of the additional SBR include, but are not limited to, emulsion-polymerized styrene butadiene rubber (E-SBR) and solution-polymerized styrene butadiene rubber (S-SBR).

The additional SBR may be an unmodified or modified SBR. Preferably, it is a modified SBR because in this case the effects of the present invention tend to be better achieved.

The modified SBR may be any SBR having a functional group interactive with a filler such as silica or carbon black. For example, it may be a chain end-modified SBR obtained by modifying at least one chain end of SBR with a compound (modifier) having the functional group (chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxyl or epoxy group is introduced.

Examples of the functional group include those listed for the chain end-modified butadiene polymer.

The additional SBR preferably has a styrene content of 15% by mass or higher, more preferably 20% by mass or higher. A styrene content of 15% by mass or higher tends to lead to better performance on ice and snow. The styrene content is also preferably 45% by mass or lower, more preferably 30% by mass or lower. A styrene content of 45% by mass or lower tends to lead to less heat build-up and better fuel economy.

The styrene content herein is determined by $^1$H-NMR analysis.

The additional SBR preferably has a vinyl content of 30% by mass or higher, more preferably 50% by mass or higher, but preferably 80% by mass or lower, more preferably 70% by mass or lower. When the vinyl content is within the above-mentioned range, the effects of the present invention tend to be better achieved.

The additional SBR preferably has a Mw of 100, 000 or more, more preferably 150,000 or more, but preferably 500,000 or less, more preferably 300,000 or less. When the Mw is within the above-mentioned range, the effects of the present invention tend to be better achieved.

The amount of the additional SBR based on 100% by mass of the rubber component is preferably 20% by mass or more, more preferably 30% by mass or more, still more preferably 40% by mass or more, but is preferably 80% by mass or less, more preferably 70% by mass or less, still more preferably 60% by mass or less. When the amount is within the above-mentioned range, the effects of the present invention tend to be better achieved.

Examples of the additional BR include, but are not limited to, high-cis BR and BR containing syndiotactic polybutadiene crystals.

The additional BR may be an unmodified or modified BR. Preferably, it is a modified BR to better achieve the effects of the present invention.

Examples of the modified BR include those into which functional groups as listed for the modified SBR have been introduced.

The additional BR preferably has a cis content of 60% by mass or higher, more preferably 80% by mass or higher, still more preferably 90% by mass or higher, particularly preferably 95% by mass or higher. When the cis content is within the above-mentioned range, the effects of the present invention tend to be better achieved.

The amount of the additional BR based on 100% by mass of the rubber component is preferably 5% by mass or more, more preferably 10% by mass or more, still more preferably 20% by mass or more, but is preferably 50% by mass or less, more preferably 40% by mass or less. When the amount is within the above-mentioned range, the effects of the present invention tend to be better achieved.

The combined amount of the additional SBR and the additional BR based on 100% by mass of the rubber component is preferably 60% by mass or more, more preferably 70% by mass or more, but is preferably 90% by mass or less. When the combined amount is within the above-mentioned range, the butadiene polymer tends to be more uniformly kneaded so that the effects of the present invention can be better achieved.

The rubber composition contains silica. Examples of the silica include dry silica (anhydrous silicic acid) and wet silica (hydrated silicic acid). Wet silica is preferred because it contains a large number of silanol groups.

The silica may be, for example, a product of Degussa, Rhodia, Tosoh Silica Corporation, Solvay Japan, or Tokuyama Corporation.

The silica preferably has a nitrogen adsorption specific surface area ($N_2SA$) of 70 $m^2/g$ or more, more preferably 150 $m^2/g$ or more. A $N_2SA$ of 70 $m^2/g$ or more tends to lead to further improved abrasion resistance. The $N_2SA$ of the silica is preferably 500 $m^2/g$ or less, more preferably 200 m²/g or less. A N₂SA of 500 m²/g or less tends to lead to further improved fuel economy.

The nitrogen adsorption specific surface area of the silica is measured by the BET method in accordance with ASTM D3037-81.

The amount of the silica per 100 parts by mass of the rubber component is preferably 30 parts by mass or more, more preferably 50 parts by mass or more, still more preferably 60 parts by mass or more. When the amount is 30 parts by mass or more, abrasion resistance tends to be further improved. The amount is preferably 100 parts by mass or less, more preferably 80 parts by mass or less. When the amount is 100 parts by mass or less, processability and fuel economy tend to be further improved.

The rubber composition contains a silane coupling agent having two or more sulfur-containing functional groups capable of binding to diene rubbers.

Examples of the sulfur-containing functional groups capable of binding to diene rubbers include monosulfide, polysulfide, and mercapto groups, with a mercapto group being preferred among these.

More preferably, the silane coupling agent contains a linking unit A represented by the following formula (2-2) and a linking unit B represented by the following formula (2-3):

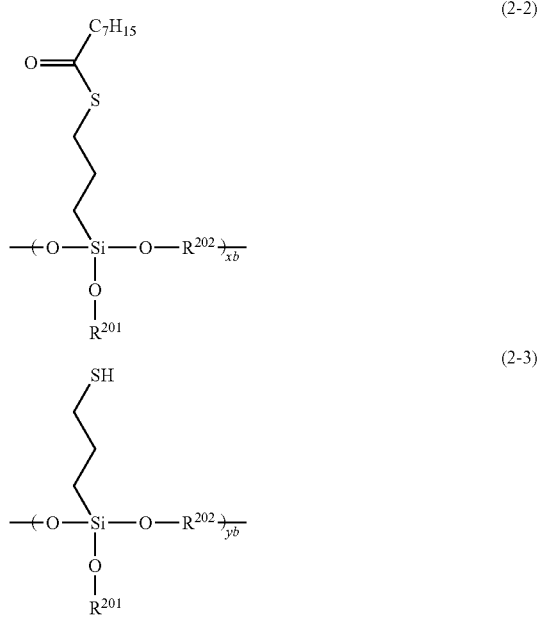

wherein xb represents an integer of 1 or more; yb represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{202}$ represents a branched or unbranched C1-C30 alkylene group, a branched or unbranched C2-C30 alkenylene group, or a branched or unbranched C2-C30 alkynylene group, provided that $R^{201}$ and $R^{202}$ may together form a cyclic structure.

In the case where the silane coupling agent containing a linking unit A of formula (2-2) and a linking unit B of formula (2-3) is used, the increase in viscosity during the processing is reduced as compared to polysulfidesilanes such as bis(3-triethoxysilylpropyl)tetrasulfide. This is presumably because, since the sulfide moiety of the linking unit A is a C—S—C bond, the silane coupling agent is thermally more stable than tetrasulfides and disulfides, and thus the Mooney viscosity is less likely to increase.

Moreover, the decrease in scorch time is reduced as compared to mercaptosilanes such as 3-mercaptopropyltrimethoxysilane. This is presumably because, though the linking unit B has a mercaptosilane structure, the —$C_7H_{15}$ moiety of the linking unit A covers the —SH group of the linking unit B to inhibit it from reacting with the polymer, and therefore scorching is less likely to occur.

In view of processability, the amount of the linking unit A in the silane coupling agent with the above structure is preferably 30 mol % or more, more preferably 50 mol % or more, but preferably 99 mol % or less, more preferably 90 mol % or less. In view of reactivity with silica, the amount of the linking unit B is preferably 1 mol % or more, more preferably 5 mol % or more, still more preferably 10 mol % or more, but preferably 70 mol % or less, more preferably 65 mol % or less, still more preferably 55 mol % or less. The combined amount of the linking units A and B is preferably 95 mol % or more, more preferably 98 mol % or more, particularly preferably 100 mol %.

The amount of the linking unit A or B refers to the amount including the linking unit A or B present at the terminal of the silane coupling agent, if any. In the case where the linking unit A or B is present at the terminal of the silane coupling agent, its form is not particularly limited as long as it forms a unit corresponding to formula (2-2) representing the linking unit A or formula (2-3) representing the linking unit B.

Examples of the halogen atom as $R^{201}$ include chlorine, bromine, and fluorine.

Examples of the branched or unbranched C1-C30 alkyl group as $R^{201}$ include methyl, ethyl, n-propyl, isopropyl, n-butyl, iso-butyl, sec-butyl, tert-butyl, pentyl, hexyl, heptyl, 2-ethylhexyl, octyl, nonyl, and decyl groups. The alkyl group preferably has 1 to 12 carbon atoms.

Examples of the branched or unbranched C2-C30 alkenyl group as $R^{201}$ include vinyl, 1-propenyl, 2-propenyl, 1-butenyl, 2-butenyl, 1-pentenyl, 2-pentenyl, 1-hexenyl, 2-hexenyl, and 1-octenyl groups. The alkenyl group preferably has 2 to 12 carbon atoms.

Examples of the branched or unbranched C2-C30 alkynyl group as $R^{201}$ include ethynyl, propynyl, butynyl, pentynyl, hexynyl, heptynyl, octynyl, nonynyl, decynyl, undecynyl, and dodecynyl groups. The alkynyl group preferably has 2 to 12 carbon atoms.

Examples of the branched or unbranched C1-C30 alkylene group as $R^{202}$ include ethylene, propylene, butylene, pentylene, hexylene, heptylene, octylene, nonylene, decylene, undecylene, dodecylene, tridecylene, tetradecylene, pentadecylene, hexadecylene, heptadecylene, and octadecylene groups. The alkylene group preferably has 1 to 12 carbon atoms.

Examples of the branched or unbranched C2-C30 alkenylene group as $R^{202}$ include vinylene, 1-propenylene, 2-propenylene, 1-butenylene, 2-butenylene, 1-pentenylene, 2-pentenylene, 1-hexenylene, 2-hexenylene, and 1-octenylene groups. The alkenylene group preferably has 2 to 12 carbon atoms.

Examples of the branched or unbranched C2-C30 alkynylene group as $R^{202}$ include ethynylene, propynylene, butynylene, pentynylene, hexynylene, heptynylene, octynylene, nonynylene, decynylene, undecynylene, and dodecynylene groups. The alkynylene group preferably has 2 to 12 carbon atoms.

In the silane coupling agent containing a linking unit A of formula (2-2) and a linking unit B of formula (2-3), the total number of repetitions (xb+yb) consisting of the sum of the number of repetitions (xb) of the linking unit A and the number of repetitions (yb) of the linking unit B is preferably in the range of 3 to 300. When the total number of repetitions is within the above-mentioned range, the —$C_7H_{15}$ moiety of the linking unit A covers the mercaptosilane of the linking unit B to reduce the decrease in scorch time while ensuring good reactivity with silica and the rubber component.

Examples of the silane coupling agent include NXT-Z30, NXT-Z45, NXT-Z60, and NXT-Z100 all available from Momentive. These silane coupling agents may be used alone, or two or more of these may be used in combination.

The amount of the silane coupling agent per 100 parts by mass of the silica is preferably 1 part by mass or more, more preferably 3 parts by mass or more. When the amount is 1 part by mass or more, the coupling effect tends to be sufficient to provide high dispersion of silica, and better abrasion resistance and fuel economy tend to be obtained. The amount of the silane coupling agent per 100 parts by mass of the silica is also preferably 15 parts by mass or less, more preferably 12 parts by mass or less, still more preferably 10 parts by mass or less. When the amount is 15 parts by mass or less, no excess silane coupling agent tends to remain, thus resulting in improved processability and tensile properties.

Silane coupling agents other than the above-mentioned silane coupling agent may further be added as long as they do not impair the effects of the present invention.

The rubber composition contains a crosslinking agent having a C3 or higher alkylene group, a polysulfide group bonded to the alkylene group, and a functional group containing a benzene ring.

The C3 or higher (preferably C3-C10, more preferably C4-C8) alkylene group is not particularly limited. It may be linear, branched, or cyclic. Preferably, it is a linear alkylene group, more preferably a hexamethylene group.

The polysulfide group is a group represented by —$S_x$— wherein x is 2 or larger, and preferably 2 to 6, more preferably 2.

The functional group is preferably a monovalent organic group containing a nitrogen atom and a benzene ring, still more preferably a monovalent organic group containing a benzene ring and a linking group represented by N—C(=S)— in which a carbon atom is bonded to a dithio group.

The crosslinking agent is preferably a compound represented by the following formula (1):

$$R^{11}\text{—S—S-A-S—S—}R^{12} \quad (1)$$

wherein A represents a C3-C10 alkylene group; and $R^{11}$ and $R^{12}$ are the same or different and each represent a monovalent organic group containing a nitrogen atom and a benzene ring.

The (C3-C10) alkylene group as A is not particularly limited. It may be a linear, branched, or cyclic alkylene group, preferably a linear alkylene group, more preferably a hexamethylene group. The $R^{11}$ or $R^{12}$ group may be any monovalent organic group containing a nitrogen atom and a benzene ring, preferably a monovalent organic group containing a benzene ring and a linking group represented by N—C(=S)— in which a carbon atom is bonded to a dithio group.

Examples of the crosslinking agent include KA9188 (1,6-bis(N,N'-dibenzylthiocarbamoyldithio)hexane) available from Lanxess. Such crosslinking agents may be used alone, or two or more of them may be used in combination.

The amount of the crosslinking agent per 100 parts by mass of the rubber component is preferably 0.1 parts by mass or more, more preferably 0.5 parts by mass or more. When the amount is 0.1 parts by mass or more, the effects of the present invention tend to be better achieved. The amount is also preferably 5 parts by mass or less, more preferably 3 parts by mass or less. When the amount is 5 parts by mass or less, curing tends to proceed at an appropriate rate.

The rubber composition preferably contains the crosslinking agent and the silane coupling agent at a mass ratio (crosslinking agent:silane coupling agent) of 1:3 to 1:15, more preferably 1:4 to 1:10. When the mass ratio is within the above-mentioned range, the rubber component can be strongly bonded to silica to improve dispersion of the silica, and therefore the effects of the present invention tend to be better achieved.

The rubber composition preferably contains carbon black.

Non-limiting examples of the carbon black include N134, N110, N220, N234, N219, N339, N330, N326, N351, N550, and N762. These types of carbon black may be used alone, or two or more of these may be used in combination.

The carbon black preferably has a nitrogen adsorption specific surface area ($N_2SA$) of 5 $m^2/g$ or more, more preferably 50 $m^2/g$ or more, still preferably 100 $m^2/g$ or more, particularly preferably 140 $m^2/g$ or more. Carbon black having a $N_2SA$ of 5 $m^2/g$ or more tends to provide improved reinforcing properties, resulting in sufficient abrasion resistance. The $N_2SA$ is also preferably 300 $m^2/g$ or less, more preferably 250 $m^2/g$ or less, still more preferably 200 $m^2/g$ or less. Carbon black having a $N_2SA$ of 300 $m^2/g$ or less tends to disperse better, thus resulting in good abrasion resistance and fuel economy.

The nitrogen adsorption specific surface area of the carbon black is determined in accordance with JIS K6217-2: 2001.

The carbon black may be, for example, a product of Asahi Carbon Co., Ltd., Cabot Japan K. K., Tokai Carbon Co., Ltd., Mitsubishi Chemical Corporation, Lion Corporation, NSCC Carbon Co., Ltd, or Columbia Carbon.

The amount of the carbon black per 100 parts by mass of the rubber component is preferably 1 part by mass or more, more preferably 5 parts by mass or more. When the amount is 1 part by mass or more, the carbon black tends to provide sufficient reinforcing properties, resulting in good abrasion resistance. The amount is also preferably 30 parts by mass or less, more preferably 15 parts by mass or less. When the amount is 30 parts by mass or less, good fuel economy tends to be obtained.

The rubber composition preferably contains an oil.

The oil may be, for example, a process oil, a vegetable fat or oil, or a mixture thereof. Examples of the process oil include paraffinic process oils, aromatic process oils, and naphthenic process oils. Examples of the vegetable fat or oil include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These oils may be used alone, or two or more of these may be used in combination. In order to well achieve the effects of the present invention, process oils are preferred among these, with aromatic process oils being more preferred.

The amount of the oil per 100 parts by mass of the rubber component is preferably 1 part by mass or more, more preferably 5 parts by mass or more, still more preferably 10 parts by mass or more, but is preferably 50 parts by mass or less, more preferably 30 parts by mass or less. When the amount is within the above-mentioned range, the effects of the present invention tend to be better achieved.

The rubber composition preferably contains a resin.

Any resin usually used in the tire industry may be used. Examples include coumarone-indene resins, α-methylstyrene-based resins, terpene-based resins, p-t-butylphenol acetylene resins, and acrylic resins. These resins may be used alone, or two or more of these may be used in combination. In order to better achieve the effects of the present invention, α-methylstyrene-based resins are preferred among these.

Coumarone-indene resins refer to resins containing coumarone and indene as monomer components forming the skeleton (backbone) of the resins. Examples of monomer components other than coumarone and indene which may be contained in the skeleton include styrene, α-methylstyrene, methylindene, and vinyltoluene.

Examples of the α-methylstyrene resins include α-methylstyrene homopolymers and copolymers of α-methylstyrene and styrene.

Examples of the terpene-based resins include polyterpene resins, terpenephenol resins, and aromatic modified terpene resins.

Polyterpene resins refer to resins produced by polymerization of terpene compounds, or hydrogenated products of the resins. The term "terpene compound" refers to a hydrocarbon having a composition represented by $(C_5H_8)_n$ or an oxygen-containing derivative thereof, each of which has a terpene backbone and is classified as, for example, a monoterpene ($C_{10}H_{16}$), sesquiterpene ($C_{15}H_{24}$), or diterpene ($C_{20}H_{32}$). Examples of such terpene compounds include α-pinene, β-pinene, dipentene, limonene, myrcene, alloocimene, ocimene, α-phellandrene, α-terpinene, β-terpinene, terpinolene, 1,8-cineole, 1,4-cineole, α-terpineol, β-terpineol, and γ-terpineol.

Examples of the polyterpene resins include terpene resins made from the above-listed terpene compounds, such as α-pinene resins, β-pinene resins, limonene resins, dipentene resins, and β-pinene-limonene resins; and hydrogenated terpene resins obtained by hydrogenation of the foregoing terpene resins.

Examples of the terpenephenol resins include resins produced by copolymerization of the above-mentioned terpene compounds and phenolic compounds; and resins obtained by hydrogenation of these resins. Specific examples include resins produced by condensation of the above-mentioned terpene compounds, phenolic compounds, and formaldehyde. Examples of the phenolic compounds include phenol, bisphenol A, cresol, and xylenol.

Examples of the aromatic modified terpene resins include resins obtained by modification of terpene resins with aromatic compounds; and resins obtained by hydrogenation of these resins. The aromatic compounds may be any compound having an aromatic ring, including:phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes; and coumarone and indene.

Examples of the p-t-butylphenol acetylene resins include resins produced by condensation of p-t-butylphenol and acetylene.

The acrylic resins may be any acrylic resin. Suitable are solvent-free acrylic resins because they contain few impurities and have a sharp molecular weight distribution, and therefore the effects of the present invention can be better achieved.

Solvent-free acrylic resins refer to (meth)acrylic resins (polymers) synthesized by high temperature continuous polymerization (high temperature continuous bulk polymerization as described in, for example, U.S. Pat. No. 4,414,370, JP S59-6207 A, JP H5-58005 B, JP H1-313522 A, U.S. Pat. No. 5,010,166, and the annual research report TREND 2000 issued by Toagosei Co., Ltd., vol. 3, pp. 42-45, all of which are incorporated herein by reference.) using no or minimal amounts of auxiliary raw materials such as polymerization initiators, chain transfer agents, and organic solvents. In the present invention, the term "(meth)acrylic" means methacrylic and acrylic.

Preferred are acrylic resins substantially free of auxiliary raw materials such as polymerization initiators, chain transfer agents, and organic solvents. In view of the effects of the present invention, also preferred are acrylic resins having a relatively narrow composition distribution or molecular weight distribution, produced by continuous polymerization.

As described above, preferred acrylic resins are substantially free of auxiliary raw materials such as polymerization initiators, chain transfer agents, and organic solvents, i.e. have high purity. The purity (resin content) of the acrylic resins is preferably 95% by mass or higher, more preferably 97% by mass or higher.

Examples of the monomer components of the acrylic resins include (meth)acrylic acid and (meth)acrylic acid derivatives such as (meth)acrylic acid esters (e.g. alkyl esters, aryl esters, aralkyl esters), (meth)acrylamide, and (meth)acrylamide derivatives.

In addition to such (meth)acrylic acid or (meth)acrylic acid derivatives, aromatic vinyls such as styrene, α-methylstyrene, vinyltoluene, vinylnaphthalene, divinylbenzene, trivinylbenzene, or divinylnaphthalene may be used as monomer components for forming the acrylic resins.

The acrylic resins may be formed of the (meth)acrylic components alone or may further contain constituent components other than the (meth)acrylic components.

The acrylic resins may have a hydroxyl group, a carboxyl group, a silanol group, or other groups.

The resin preferably has a softening point of 30° C. or higher, more preferably 60° C. or higher, still more preferably 80° C. or higher. A softening point of 30° C. or higher tends to lead to desired wet grip performance. The softening point is also preferably 160° C. or lower, more preferably 130° C. or lower, still more preferably 100° C. or lower. A resin having a softening point of 160° C. or lower tends to disperse well, thus resulting in improved wet grip performance and fuel economy.

Herein, the softening point of the resin is determined as specified in JIS K 6220-1:2001 using a ring and ball softening point measuring apparatus and defined as the temperature at which the ball drops down.

The resin may be, for example, a product of Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Nippon Oil & Energy Corporation, Arakawa Chemical Industries, Ltd., or Taoka Chemical Co., Ltd.

The amount of the resin per 100 parts by mass of the rubber component is preferably 1 part by mass or more, more preferably 3 parts by mass or more, but is preferably 50 parts by mass or less, more preferably 30 parts by mass or less, still more preferably 10 parts by mass or less. When the amount is within the above-mentioned range, the effects of the present invention tend to be well achieved.

The rubber composition preferably contains zinc oxide. The zinc oxide may be a conventionally known one, and examples include products of Mitsui Mining & Smelting Co., Ltd., Toho Zinc Co., Ltd., HakusuiTech Co., Ltd., Seido Chemical Industry Co., Ltd., and Sakai Chemical Industry Co., Ltd.

The amount of the zinc oxide per 100 parts by mass of the rubber component is preferably 0.5 parts by mass or more, more preferably 1 part by mass or more, but is preferably 10 parts by mass or less, more preferably 5 parts by mass or less. When the amount is within the above-mentioned range, the effects of the present invention tend to be better achieved.

The rubber composition preferably contains stearic acid.

The stearic acid may be a conventionally known one, and examples include products of NOF Corporation, Kao Corporation, Wako Pure Chemical Industries, Ltd., and Chiba Fatty Acid Co., Ltd.

The amount of the stearic acid per 100 parts by mass of the rubber component is preferably 0.5 parts by mass or more, more preferably 1 part by mass or more, but is preferably 10 parts by mass or less, more preferably 5 parts by mass or less. When the amount is within the above-mentioned range, the effects of the present invention tend to be well achieved.

The rubber composition preferably contains an antioxidant.

Examples of the antioxidant include: naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis-[methylene-3-(3',5'-di-t-butyl-4'-hydroxyphenyl) propionate]methane. These antioxidants may be used alone, or two or more of these may be used in combination. Among these, p-phenylenediamine antioxidants are preferred, with N-(1,3-dimethylbutyl)-N'-phenyl-p-phenylenediamine being more preferred.

The antioxidant may be, for example, a product of Seiko Chemical Co., Ltd., Sumitomo Chemical Co., Ltd., Ouchi Shinko Chemical Industrial Co., Ltd., or Flexsys.

The amount of the antioxidant per 100 parts by mass of the rubber component is preferably 0.5 parts by mass or more, more preferably 1 part by mass or more, but is preferably 10 parts by mass or less, more preferably 5 parts by mass or less. When the amount is within the above-mentioned range, the effects of the present invention tend to be well achieved.

The rubber composition preferably contains sulfur.

Examples of the sulfur include those usually used in the rubber industry, such as powdered sulfur, precipitated sulfur, colloidal sulfur, insoluble sulfur, highly dispersible sulfur, and soluble sulfur. These types of sulfur may be used alone, or two or more of these may be used in combination.

The sulfur may be, for example, a product of Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur per 100 parts by mass of the rubber component is preferably 0.1 parts by mass or more, more preferably 0.5 parts by mass or more, but is preferably 10 parts by mass or less, more preferably 3 parts by mass or less. When the amount is within the above-mentioned range, the effects of the present invention tend to be well achieved.

The combined amount of the crosslinking agent and the sulfur per 100 parts by mass of the rubber component is preferably 0.1 parts by mass or more, more preferably 0.5 parts by mass or more, but is preferably 10 parts by mass or less, more preferably 3 parts by mass or less. When the amount is within the above-mentioned range, the effects of the present invention tend to be well achieved.

The rubber composition preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazolyl sulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These vulcanization accelerators may be used alone, or two or more of these may be used in combination. Among these, sulfenamide vulcanization accelerators and guanidine vulcanization accelerators are preferred in order to more suitably achieve the effects of the present invention.

The amount of the vulcanization accelerator per 100 parts by mass of the rubber component is preferably 1 part by mass or more, more preferably 3 parts by mass or more, but is preferably 10 parts by mass or less, more preferably 7 parts by mass or less. When the amount is within the above-mentioned range, the effects of the present invention tend to be well achieved.

The rubber composition may contain other additives usually used in the tire industry, in addition to the above-mentioned components. Examples of such additives include organic peroxides; fillers such as calcium carbonate, talc, alumina, clay, aluminum hydroxide, and mica; and processing aids such as plasticizers and lubricants.

The rubber composition may be prepared, for example, by kneading the components using a rubber kneading machine such as an open roll mill or a Banbury mixer, and vulcanizing the kneaded mixture.

(Pneumatic Tire)

The pneumatic tire may be formed from the rubber composition by conventional methods. Specifically, the unvulcanized rubber composition containing the components may be extruded into the shape of a tread and then assembled with other tire components on a tire building machine in a usual manner to build an unvulcanized tire, which may then be heated and pressurized in a vulcanizer to produce a tire.

The pneumatic tire may be suitably used as a cold weather tire. It may also be suitably used as a tire for passenger vehicles, large passenger vehicles, large SUVs, heavy load vehicles such as trucks and buses, light trucks, or other vehicles.

EXAMPLES

The present invention is specifically described with reference to, but not limited to, examples below.

The chemicals used in the examples and comparative examples are listed below.

NR: TSR20

SBR 1: modified SBR produced in Production Example 1 described below (styrene content: 25% by mass, vinyl content: 60% by mass, sum of cis and trans contents: 40% by mass, Mw: 200,000)

SBR 2: modified SBR produced in Production Example 2 described below (styrene content: 10% by mass, vinyl content: 40% by mass, sum of cis and trans contents: 60% by mass, Mw: 200,000)

BR 1: modified BR produced in Production Example 3 described below (cis content: 36% by mass, trans content: 52% by mass, vinyl content: 12% by mass, Mw: 550,000)

BR 2: BR 150B available from Ube Industries, Ltd. (cis content: 97% by mass)

Carbon black: N134 available from Mitsubishi Chemical Corporation ($N_2SA$: 170 $m^2/g$)

Silica: ULTRASIL VN3 available from Degussa ($N_2SA$: 175 $m^2/g$)

Silane coupling agent 1: Si266 available from Degussa (bis(3-triethoxysilylpropyl)disulfide)

Silane coupling agent 2: NXT-Z45 available form Momentive Performance Materials Inc. (silane coupling agent having two or more mercapto groups, silane coupling agent containing a linking unit A of formula (2-2) and a linking unit B of formula (2-3) (linking unit A: 55 mol %, linking unit B: 45 mol %))

Oil: Diana Process NH-70S (aromatic process oil) available from Idemitsu Kosan Co., Ltd.

Resin: Sylvatraxx 4401 available from Arizona Chemical (copolymer of α-methylstyrene and styrene, softening point: 85° C., Tg: 43° C.)

Zinc oxide: zinc oxide #1 available from Mitsui Mining & Smelting Co., Ltd.

Stearic acid: stearic acid available form NOF Corporation

Antioxidant 1: N-1,3-dimethylbutyl-N'-phenyl-p-phenylenediamine (6C)

Antioxidant 2: poly(2,2,4-trimethyl-1,2-dihydroquinoline) (FR)

Sulfur: powdered sulfur available from Karuizawa Sulfur Co. Ltd.

Crosslinking agent: KA9188 available from Lanxess (1,6-bis(N,N'-dibenzylthiocarbamoyldithio)hexane)

Vulcanization accelerator 1: N-t-butyl-2-benzothiazole sulfenamide (TBBS)

Vulcanization accelerator 2: 1,3-diphenylguanidine (DPG)

Production Example 1

A nitrogen-purged autoclave reactor was charged with cyclohexane, tetrahydrofuran, styrene, and 1,3-butadiene. The temperature of the mixture in the reactor was adjusted to 20° C., and then n-butyllithium was added thereto to initiate polymerization. The polymerization was carried out under adiabatic conditions, and the maximum temperature reached 85° C. Once the polymerization conversion ratio reached 99%, butadiene was added, followed by polymerization for five minutes. Subsequently, 3-diethylaminopropyltriethoxysilane was added as a modifier, and a reaction was performed for 15 minutes. After completion of the polymerization, 2,6-di-tert-butyl-p-cresol was added, and then the solvent was removed by steam stripping. The resulting product was dried on heated rolls controlled to 110° C., thereby obtaining a modified styrene butadiene rubber (SBR 1).

Production Example 2

A nitrogen-purged autoclave reactor was charged with cyclohexane, tetrahydrofuran, styrene, and 1,3-butadiene. The temperature of the mixture in the reactor was adjusted to 20° C., and then n-butyllithium was added thereto to initiate polymerization. The polymerization was carried out under adiabatic conditions, and the maximum temperature reached 85° C. Once the polymerization conversion ratio reached 99%, butadiene was added, followed by polymerization for five more minutes. Subsequently, methyltriethoxysilane was added as a modifier, and a reaction was performed for 15 minutes. After completion of the polymerization, 2,6-di-tert-butyl-p-cresol was added, and then the solvent was removed by steam stripping. The resulting product was dried on heated rolls controlled to 110° C., thereby obtaining a modified styrene butadiene rubber (SBR 2).

Production Example 3

To a graduated flask in a nitrogen atmosphere were added 3-dimethylaminopropyltrimethoxysilane and then anhydrous hexane to prepare a terminal modifier.

A sufficiently nitrogen-purged pressure-proof vessel was charged with n-hexane, butadiene, and TMEDA, followed by heating to 60° C. Thereafter, butyllithium was added, and the mixture was heated to 50° C. and stirred for three hours. Then, the terminal modifier was added, and the mixture was stirred for 30 minutes. To the reaction solution were added methanol and 2,6-tert-butyl-p-cresol, and the resulting reaction solution was put into a stainless steel vessel containing methanol, and aggregates were collected. The aggregates were dried under reduced pressure for 24 hours to obtain a modified polybutadiene rubber (BR 1).

EXAMPLES AND COMPARATIVE EXAMPLES

The materials other than the sulfur, crosslinking agent, and vulcanization accelerators used in each of the formulations shown in Table 1 were kneaded for five minutes at 150° C. using a Banbury mixer (Kobe Steel, Ltd.) to give a kneaded mixture. To the kneaded mixture were added the sulfur, crosslinking agent, and vulcanization accelerators, and they were kneaded for five minutes at 80° C. using an open roll mill to obtain an unvulcanized rubber composition. The unvulcanized rubber composition was molded into the shape of a tread and then assembled with other tire components to build an unvulcanized tire. The unvulcanized tire was press-vulcanized at 170° C. for 10 minutes to obtain a test tire (size: 195/65R15). The test tires prepared as above were evaluated as described below. Table 1 shows the results.

(Fuel Economy)

The loss tangent (tan δ) of samples collected from the tread of each test tire was measured at 30° C. using a viscoelastic spectrometer (Ueshima Seisakusho Co., Ltd.) at an initial strain of 10%, a dynamic strain of 2%, and a frequency of 10 Hz. The tan δ values are expressed as an index (fuel economy index), with Comparative Example 5 set equal to 100. A higher index indicates better fuel economy.

(Abrasion Resistance)

The volume loss of samples collected from the tread of each test tire was measured with a laboratory abrasion and skid tester (LAT tester) at a load of 50 N, a speed of 20 km/h, and a slip angle of 5 degrees. The volume losses are expressed as an index (abrasion resistance index), with Comparative Example 5 set equal to 100. A higher index indicates better abrasion resistance.

(Performance on Ice and Snow)

The complex modulus E* (MPa) of samples collected from the tread of each test tire was measured at −10° C. using a viscoelastic spectrometer (Ueshima Seisakusho Co., Ltd.) at an initial strain of 10%, a dynamic strain of 2%, and a frequency of 10 Hz. The E* values are expressed as an index (index of performance on ice and snow), with Comparative Example 5 set equal to 100. A higher index indicates less increase in hardness at low temperatures and better performance on ice and snow.

TABLE 1

|  |  | Example | | | | | | | | Comparative Example | | | | | | |
|---|---|---|---|---|---|---|---|---|---|---|---|---|---|---|---|---|
|  |  | 1 | 2 | 3 | 4 | 5 | 6 | 7 | 8 | 1 | 2 | 3 | 4 | 5 | 6 | 7 |
| Formulation (parts by mass) | NR | 10 | 10 | 10 | 10 | 10 | 10 | 10 | 10 | 10 | 10 | 10 | 10 | 10 | 10 | 10 |
|  | SBR 1 | 50 | 50 | 50 | 50 | 50 | 50 | 50 | 50 | 50 | 50 | 50 | 50 | 50 | 50 | 50 |
|  | SBR 2 | — | — | — | — | — | — | — | — | 10 | — | 10 | 10 | — | — | 10 |
|  | BR 1 | 10 | 30 | 10 | 10 | 10 | 10 | 10 | 10 | — | 10 | — | — | 10 | 10 | — |
|  | BR 2 | 30 | 10 | 30 | 30 | 30 | 30 | 30 | 30 | 30 | 30 | 30 | 30 | 30 | 30 | 30 |
|  | Carbon black | 10 | 10 | 10 | 10 | 10 | 10 | 30 | 10 | 10 | 10 | 10 | 10 | 10 | 10 | 10 |
|  | Silica | 70 | 70 | 70 | 70 | 70 | 70 | 50 | 90 | 70 | 70 | 70 | 70 | 70 | 70 | 70 |
|  | Silane coupling agent 1 | — | — | — | — | — | — | — | — | 5.6 | 5.6 | — | 5.6 | — | 5.6 | — |
|  | Silane coupling agent 2 | 5.6 | 5.6 | 3.5 | 8.4 | 5.6 | 8.4 | 4 | 7.2 | — | — | 5.6 | — | 5.6 | — | 5.6 |
|  | Oil | 20 | 20 | 20 | 20 | 20 | 20 | 20 | 20 | 20 | 20 | 20 | 20 | 20 | 20 | 20 |
|  | Resin | 5 | 5 | 5 | 5 | 5 | 5 | 5 | 5 | 5 | 5 | 5 | 5 | 5 | 5 | 5 |
|  | Zinc oxide | 2 | 2 | 2 | 2 | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 | 2 | 2 | 2 | 2 |
|  | Antioxidant 1 | 2 | 2 | 2 | 2 | 2 | 2 | 2 | 2 | 2 | 2 | 2 | 2 | 2 | 2 | 2 |
|  | Antioxidant 2 | 1 | 1 | 1 | 1 | 1 | 1 | 1 | 1 | 1 | 1 | 1 | 1 | 1 | 1 | 1 |
|  | Sulfur | 0.6 | 0.6 | 0.6 | 0.6 | 1 | 1 | 0.6 | 0.6 | 1.6 | 1.6 | 1.6 | 0.6 | 1.6 | 0.6 | 0.6 |
|  | Crosslinking agent | 1 | 1 | 1 | 1 | 0.6 | 0.6 | 1 | 1 | — | — | — | 1 | — | 1 | 1 |
|  | Vulcanization accelerator 1 | 2 | 2 | 2 | 2 | 2 | 2 | 2 | 2 | 2 | 2 | 2 | 2 | 2 | 2 | 2 |
|  | Vulcanization accelerator 2 | 2 | 2 | 2 | 2 | 2 | 2 | 2 | 2 | 2 | 2 | 2 | 2 | 2 | 2 | 2 |
| Evaluation | Fuel economy index | 105 | 102 | 103 | 107 | 102 | 104 | 100 | 101 | 97 | 93 | 100 | 96 | 100 | 97 | 99 |
|  | Abrasion resistance index | 114 | 120 | 111 | 117 | 118 | 110 | 119 | 117 | 91 | 97 | 100 | 99 | 100 | 97 | 95 |
|  | Index of performance on ice and snow | 105 | 108 | 104 | 109 | 103 | 107 | 102 | 110 | 95 | 97 | 96 | 96 | 100 | 97 | 90 |

Table 1 demonstrates that the tires of the examples containing a rubber component including a specific butadiene polymer, silica, a specific silane coupling agent, and a specific crosslinking agent exhibited a balanced improvement of fuel economy, abrasion resistance, and performance on ice and snow.

In particular, the results in Example 1 and Comparative Examples 1 to 4 demonstrate that the combined use of the specific butadiene polymer, the specific silane coupling agent, and the specific crosslinking agent synergistically improved the balance of the properties.

The invention claimed is:

1. A pneumatic tire, comprising a tread formed from a rubber composition, the rubber composition comprising:
   a rubber component including a butadiene polymer having a trans content of 45% by mass or higher and a vinyl content of 20% by mass or lower;
   silica;
   a silane coupling agent having two or more sulfur-containing functional groups capable of binding to diene rubbers; and
   a crosslinking agent having a C3 or higher alkylene group, a polysulfide group bonded to the alkylene group, and a functional group containing a benzene ring.

2. The pneumatic tire according to claim 1,
   wherein the rubber composition comprises the crosslinking agent and the silane coupling agent at a mass ratio of 1:3 to 1:15.

3. The pneumatic tire according to claim 1,
   wherein a difference between a cis content and the trans content of the butadiene polymer is 30% by mass or less.

4. The pneumatic tire according to claim 1,
   wherein the crosslinking agent is a compound represented by the following formula (1):

$$R^{11}-S-S-A-S-S-R^{12} \qquad (1)$$

wherein A represents a C3-C10 alkylene group; and $R^{11}$ and $R^{12}$ are the same or different and each represent a monovalent organic group containing a nitrogen atom and a benzene ring.

5. The pneumatic tire according to claim 1,
   wherein the silane coupling agent contains a linking unit A represented by the following formula (2-2) and a linking unit B represented by the following formula (2-3):

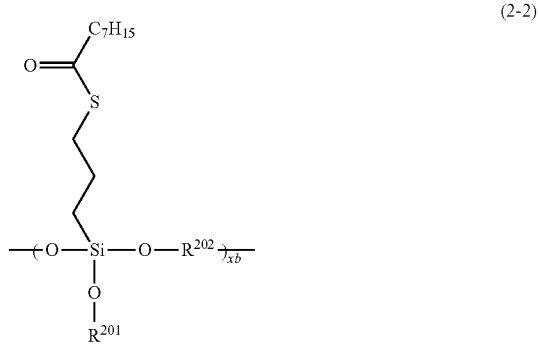

-continued

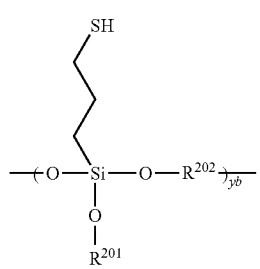
(2-3)

wherein xb represents an integer of 1 or more; yb represents an integer of 1 or more; $R^{201}$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxyl group or a carboxyl group; and $R^{202}$ represents a branched or unbranched C1-C30 alkylene group, a branched or unbranched C2-C30 alkenylene group, or a branched or unbranched C2-C30 alkynylene group, provided that $R^{201}$ and $R^{202}$ may together form a cyclic structure.

* * * * *